United States Patent
Kai et al.

(10) Patent No.: US 11,039,024 B2
(45) Date of Patent: Jun. 15, 2021

(54) IMAGING FORMING APPARATUS HAVING OPERATION DETECTOR AND HUMAN BODY DETECTOR AND METHOD FOR CONTROLLING THE SAME

(71) Applicant: CANON KABUSHIKI KAISHA, Tokyo (JP)

(72) Inventors: Teruhito Kai, Abiko (JP); Hiroto Nishihara, Tsukuba (JP); Hiromi Shimura, Toride (JP); Keita Takahashi, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 16/458,752

(22) Filed: Jul. 1, 2019

(65) Prior Publication Data

US 2020/0014811 A1    Jan. 9, 2020

(30) Foreign Application Priority Data

Jul. 6, 2018 (JP) .............................. JP2018-129179

(51) Int. Cl.
| | |
|---|---|
| *G06F 3/12* | (2006.01) |
| *H04N 1/00* | (2006.01) |
| *G03G 15/00* | (2006.01) |
| *B65H 5/06* | (2006.01) |
| *B65H 7/02* | (2006.01) |

(52) U.S. Cl.
CPC ......... *H04N 1/00482* (2013.01); *B65H 5/062* (2013.01); *B65H 7/02* (2013.01); *G03G 15/6511* (2013.01); *H04N 1/00395* (2013.01)

(58) Field of Classification Search
CPC .......... H04N 1/00482; H04N 1/00395; B65H 5/062; B65H 7/02; G03G 15/6511
USPC ........................................ 358/1.1–1.18, 474
See application file for complete search history.

(56) References Cited

U.S. PATENT DOCUMENTS

| | | | |
|---|---|---|---|
| 5,107,279 A | 4/1992 | Yamamoto | |
| 2014/0092417 A1* | 4/2014 | Kuroishi | ............ H04N 1/00342 |
| | | | 358/1.14 |
| 2014/0153013 A1* | 6/2014 | Imamura | ............ G03G 15/5004 |
| | | | 358/1.12 |
| 2014/0355020 A1* | 12/2014 | Shiraishi | ............ H04N 1/00896 |
| | | | 358/1.13 |
| 2014/0376020 A1* | 12/2014 | Imamura | ............ H04N 1/00896 |
| | | | 358/1.13 |

(Continued)

*Primary Examiner* — Gabriel I Garcia
(74) *Attorney, Agent, or Firm* — Canon U.S.A., Inc. IP Division

(57) ABSTRACT

An image forming apparatus includes a first detector that detects an operation from which input of a start instruction for forming an image is predicted, a second detector that detects a human body, and a controller that controls starting a preparation operation even without input of the start instruction in a case where the operation is detected. The controller controls ending the preparation operation where the start instruction is not input even after a first predetermined time has passed since the start of the preparation operation and the second detector does not detect the human body, and controls continuing the preparation operation in a case where the start instruction is not input even after the first predetermined time has passed since the start of the preparation operation and the second detector detects the human body.

16 Claims, 9 Drawing Sheets

(56) References Cited

U.S. PATENT DOCUMENTS

| | | | |
|---|---|---|---|
| 2015/0264209 A1* | 9/2015 | Shiraishi | H04N 1/4433 358/1.15 |
| 2016/0142576 A1* | 5/2016 | Yamaguchi | H04N 1/00896 358/1.13 |
| 2017/0277087 A1* | 9/2017 | Sakaguchi | G03G 15/553 |

* cited by examiner

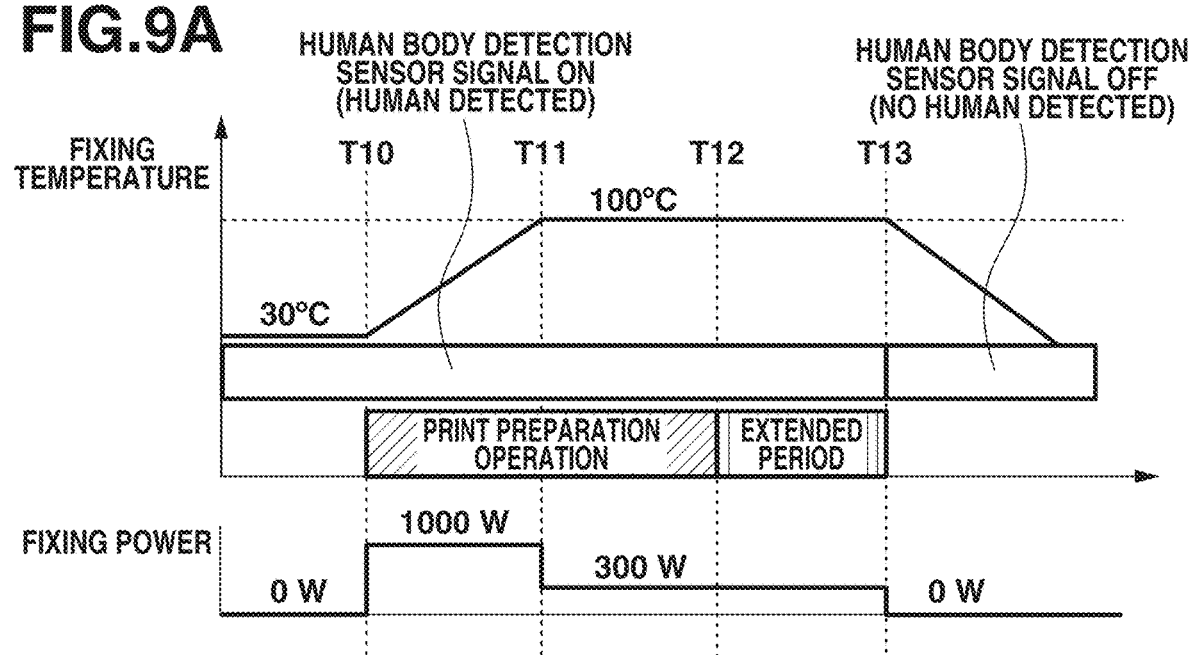
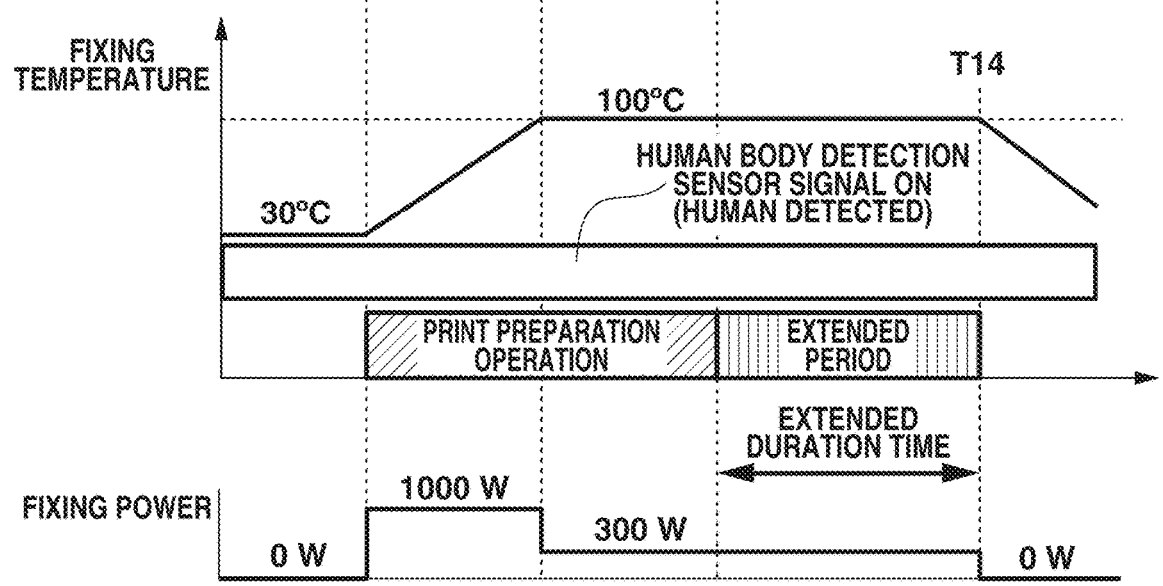

IMAGING FORMING APPARATUS HAVING OPERATION DETECTOR AND HUMAN BODY DETECTOR AND METHOD FOR CONTROLLING THE SAME

BACKGROUND

Field

The present disclosure relates to an image forming apparatus including a human detection sensor.

Description of the Related Art

There has been a need to shorten a first print output time (hereinafter referred to as an FPOT) from issuance of a print instruction to discharge of a printed sheet for electrophotographic image forming apparatuses. Similarly, has also been a need to shorten a first copy output time (hereinafter referred to as an FCOT) from pressing of a copy start key to discharge of a copied sheet. There is a known a technique that performs a print preparation operation before input of an instruction to start printing or copying as one method of saving time.

U.S. Pat. No. 5,107,279 discusses an image forming apparatus starting a print preparation operation even without receiving a print instruction when detecting an operation from which an issue of the print instruction is predicted. For example, an operation on an operation unit of the image forming apparatus or placing a document on a document reading device by a user. The print preparation operation refers to a preparation operation for bringing the image forming apparatus into a state ready to form an image, and, for example includes starting rotating of a polygon motor. Generally, a polygon motor takes longer to start the rotation until stabilizing a speed compared to starting a motor that drives a photosensitive member and a motor that drives a roller for conveying a sheet. Therefore, starting rotating the polygon motor in advance brings about an advantage that the printing can start without waiting for the time since the print instruction is input until the rotation of the polygon motor is stabilized.

The print preparation operation includes an operation of warming up a fixing unit. Such print preparation operations on the polygon motor and the fixing unit improve a user's convenience in light of the FCOT and the FPOT, but it is undesirable to operate them for a long time in light of a negative impact on their lifetimes. Therefore, if the print instruction is not input even after a predetermined time has passed since the start of the print preparation operation, the image forming apparatus performs control to end the print preparation operation.

The conventional technique ends the print preparation operation after a fixed determined time (a duration time) has passed due to absence of the input of the print instruction since the start of the print preparation operation, but includes the following issues.

When the duration time of the print preparation operation is relatively short, the print preparation operation adds only relatively short operation times of the polygon motor and the fixing unit, and thus can reduce the influence thereof on the lifetimes. Such a short duration time however, makes it more frequent for the print preparation operation to end before the print instruction is received. Therefore, after the print instruction is issued, the polygon motor should be driven to operate until the rotation thereof is stabilized again, and the operation of warming up the fixing unit should be performed until the image forming apparatus reestablishes the printable state. In other words, this arrangement does not enable the image forming apparatus to wait in the printable state when the print instruction is input, and thus, the FCOT and FPOT are not shortened.

When the duration time of the print preparation operation is relatively long, the image forming apparatus can be kept in the printable waiting state for a relatively long time, and thus can shorten the FCOT or the FPOT. Such a long duration time leads to unnecessary increases in times during which the polygon motor and the fixing unit are in operation if the print instruction is not input although the print preparation operation starts. In other words, the lifetimes of the polygon motor and the fixing unit are undesirably shortened.

Under these circumstances, the time since the operation from which the issue of the print instruction is predicted until the actual issue of the print instruction varies depending on the user, and therefore it is difficult to determine an optimum duration time of the print preparation operation to improve the usability while reducing the influence on the lifetimes.

SUMMARY

The present disclosure is directed to providing an image forming apparatus that curbs the reduction in the lifetimes of components while improving the usability by appropriately setting the time during which a print preparation operation before a print instruction lasts.

According to an aspect of the present disclosure, an image forming apparatus includes an image forming unit configured to form an image on a sheet, an input unit configured to receive an input of a start instruction for forming the image, a first detector configured to detect an operation from which the input of the start instruction is predicted, a second detector configured to detect a human body, and a controller configured to control the image forming unit to start a preparation operation for bringing the image forming unit into a state ready to form the image even without input of the start instruction in a case where the operation is detected by the first detector. The controller controls the image forming unit to end the preparation operation in a case where the start instruction is not input even after a first predetermined time has passed since the start of the preparation operation and the second detector does not detect the human body, and controls the image forming unit to continue the preparation operation in a case where the start instruction is not input even after the first predetermined time has passed since the start of the preparation operation and the second detector detects the human body.

Further features of the present disclosure will become apparent from the following description of exemplary embodiments with reference to the attached drawings.

BRIEF DESCRIPTION OF THE DRAWINGS

FIGS. 9A and 9B illustrate the temperature adjustment control on the fixing device in the extended print preparation operation.

DESCRIPTION OF THE EMBODIMENTS

<Schematic Configuration of Image Forming System>

Figure 1:
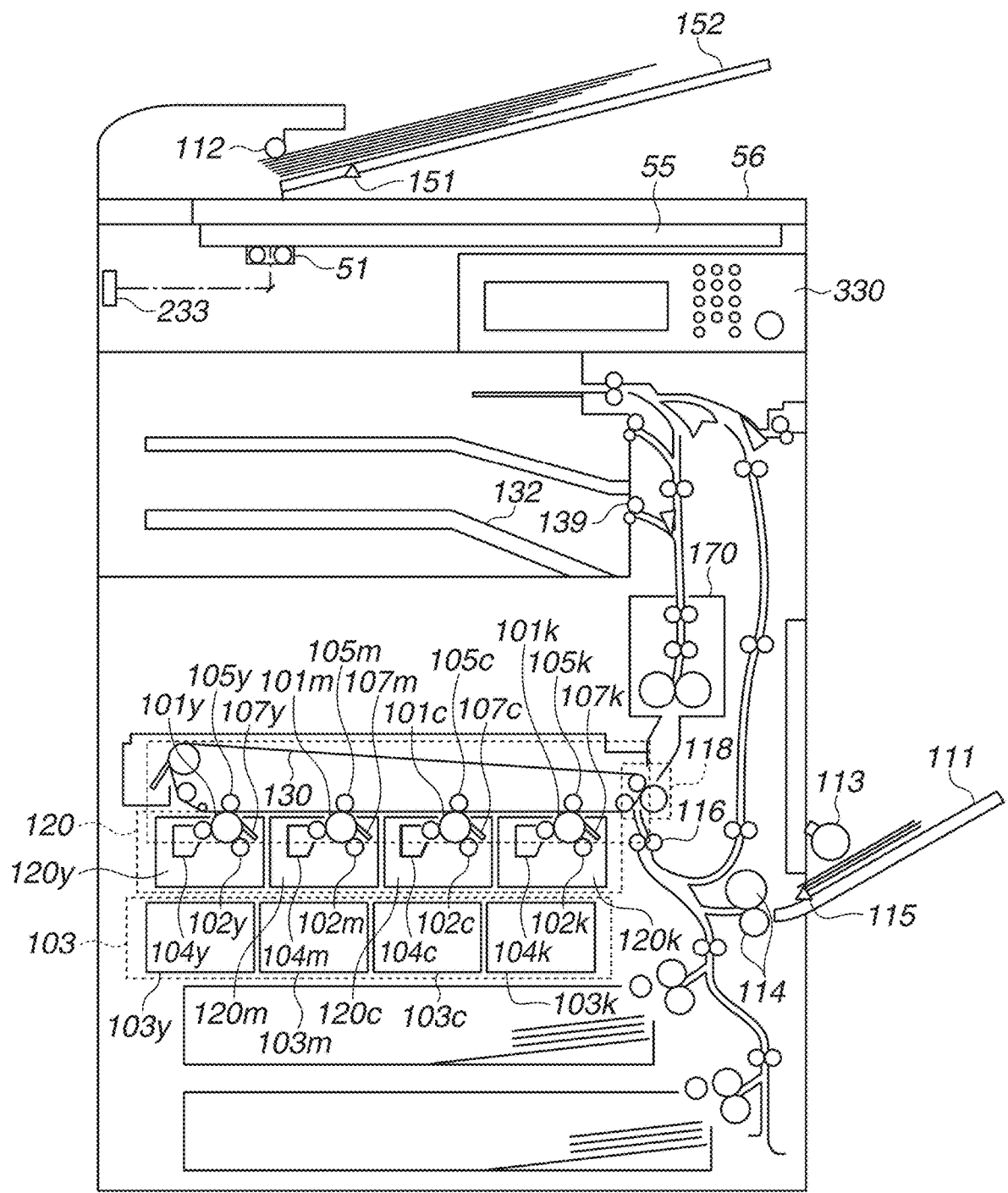
FIG. 1 is a cross-sectional view of an image forming apparatus.
Figure 2:
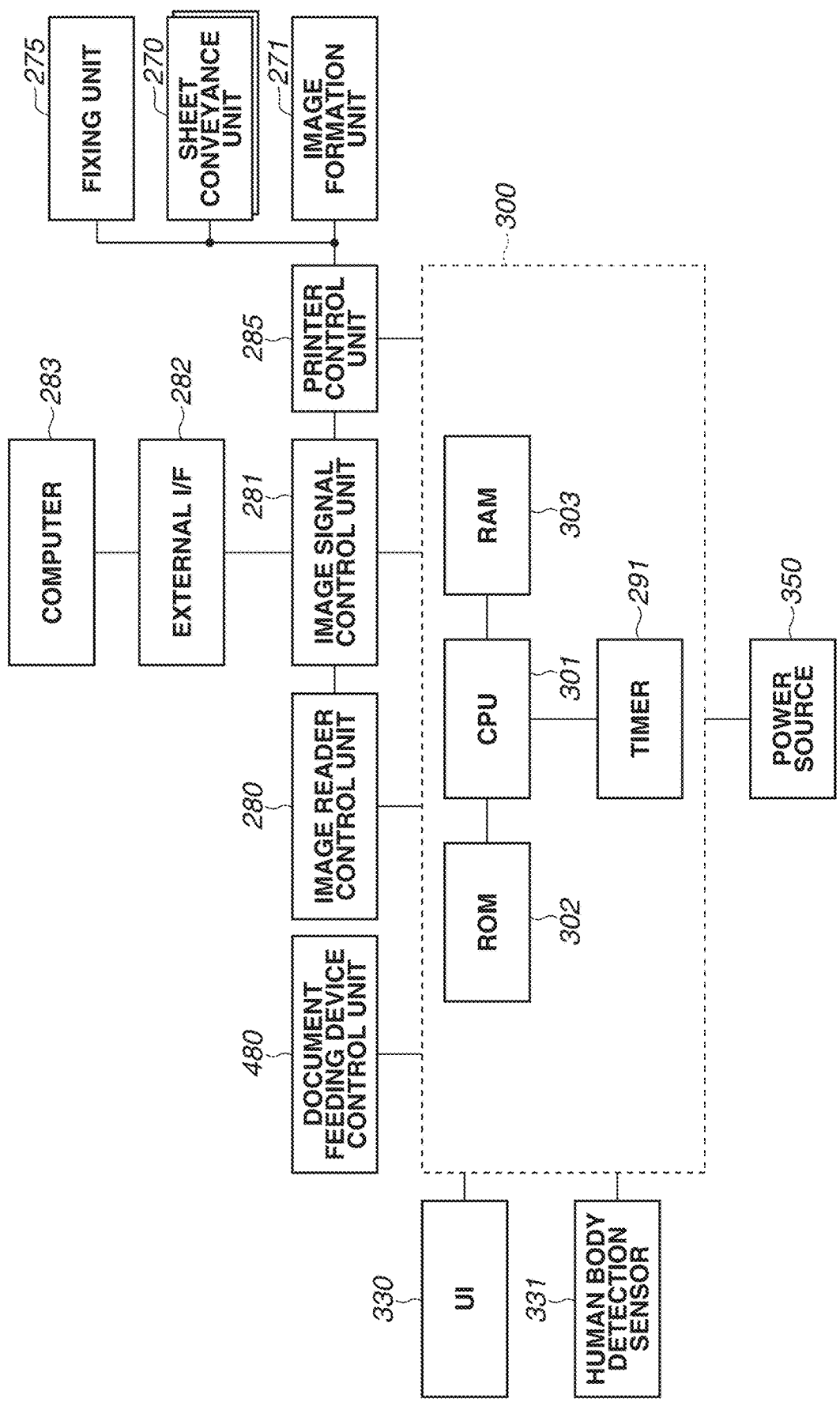
FIG. 2 is a control block diagram of the image forming apparatus.

FIG. 1 is a cross-sectional view of an image forming apparatus according to an exemplary embodiment of the present disclosure, and FIG. 2 is a control block diagram of the image forming apparatus illustrated in FIG. 1. A basic configuration will be described with reference to FIGS. 1 and 2.

[Schematic Configuration of Image Forming Apparatus]

In FIG. 2, a control unit 300 controls the image forming apparatus illustrated in FIG. 1, and includes a central processing unit (CPU) 301, a read only memory (ROM) 302, a random access memory (RAM) 303, and a timer 291.

The CPU 301 controls the image forming apparatus. The ROM 302, in which a control program is written, and the RAM 303, which stores therein a variable for use in the control and image data read out by an image sensor 233 illustrated in FIG. 1, are connected to the CPU 301 via an address bus and a data bus. The timer 291, which can count time, is connected to the CPU 301, and the CPU 301 sets a time count value of the timer 291 and acquires a timer measured value.

The CPU 301, for example, drives a document conveyance roller 112 and detects whether there is a document using a document presence/absence sensor 151 via a document feeding device control unit 480. The CPU 301 detects an open/close operation of a document pressing plate 56 and reads out an image of a document on a document pressing plate glass plate 55, and reads out a document image fed by the document feeding device control unit 480, via an image reader control unit 280. The image sensor 233 is used to read out the document image. The CPU 301 transfers an analog image signal output from the image sensor 233 by the image reader control unit 280 to an image signal control unit 281.

At the time of a copy operation of reading out the image on the document and printing the read image on a sheet, the image signal control unit 281 performs various kinds of processing after converting the analog image signal from the image sensor 233 into a digital image signal, and converts this digital image signal into a video signal and then outputs it to a printer control unit 285. At the time of a print operation of printing an image transferred from a computer on a sheet, the image signal control unit 281 performs various kinds of processing on a digital image signal input from a computer 283 via an external interface (I/F) 282, and converts this digital image signal into a video signal and then outputs it to the printer control unit 285.

The printer control unit 285 instructs an image formation unit 271 to form the image based on an instruction from the CPU 301. The image formation unit 271 drives an image forming unit 120 based on the input video signal. The printer control unit 285 controls feeding and conveyance of the sheet to a sheet conveyance unit 270 based on an instruction from the CPU 301. More specifically, the CPU 301 detects whether there is a sheet on a manual sheet feeding tray 111 as a sheet tray illustrated in FIG. 1 by a sheet presence/absence detection sensor 115. In a case where the sheet presence/absence detection sensor 115 detects that there is a sheet, the printer control unit 285 performs an operation of lowering a sheet feeding pickup roller 113 using a sheet feeding pickup roller elevation motor as a driving source therefor based on an instruction from the CPU 301. The printer control unit 285 then rotationally drives the sheet feeding pickup roller 113 and a sheet feeding roller 114 using a sheet feeding conveyance motor as a driving source therefor, thereby feeding the sheet.

A user interface (UI) 330 is an operation unit operated by a user, and, for example, receives a selection of a color mode to form an image and an instruction to, for example, start copying, and displays a state of the image forming apparatus.

[Basic Image Forming Operation of Image Forming Apparatus]

A basic image forming operation will be described. When detecting that the sheet is set on the manual sheet feeding tray 111 by the sheet presence/absence detection sensor 115, the CPU 301 displays a sheet size selection screen on the UI 330. A sheet size set by the user is stored into the RAM 303. When the sheet size is set, the printer control unit 285 lowers the sheet feeding pickup roller 113 onto the manual sheet feeding tray 111 to bring the sheet feeding pickup roller 113 into abutment with the sheet, thereby establishing a state ready to feed the sheet. A position at which the sheet feeding pickup roller 113 is in abutment with the sheet is an abutment position.

When detecting an operation of setting a condition regarding the printing from the UI 330 by the user, or detecting an operation of opening/closing the document pressing plate 56 or an operation of placing the document by the user via the document feeding device control unit 480 or the image reader control unit 280, the CPU 301 causes the printer control unit 285 to perform a print preparation operation. As one example of the print preparation operation, the CPU 301 causes the printer control unit 285 to start temperature adjustment control on a fixing device 170. If the size of the sheet on the manual sheet feeding tray 111 is confirmed and the sheet feeding pickup roller 113 is not located at the sheet feeding abutment position, the CPU 301 causes the printer control unit 285 to move the sheet feeding pickup roller 113 to the sheet feeding abutment position as the print preparation operation. Such a preparation operation is also called a premature operation because being performed before an instruction to start the printing is input.

When the instruction to start the print operation is input, the CPU 301 starts reading out the document via the document feeding device control unit 480. The document feeding device control unit 480 drives the document conveyance roller 112 to convey the document sheet from the document tray 152 onto the document pressing plate glass plate 55, and also irradiates the document pressing plate glass plate 55 with light of a lamp 51. The image forming apparatus is configured such that reflected light from the document is guided to the image sensor 233 via a mirror, and the image data on the document read out by the image sensor 233 is output to the image signal control unit 281. The readout processing continues until the document presence/absence sensor 151 detects that all of documents on the document tray 152 are fed.

As will be used herein, y, m, c, and k indicate components corresponding to yellow, magenta, cyan, and black colors, respectively. For example, the image forming units 120(y, m, c, and k) indicate a yellow image forming unit 120y, a magenta image forming unit 120m, a cyan image forming unit 120c, and a black image forming unit 120k, respectively. The CPU 301 controls image forming units 120(y, m, c, and k) included in the image formation unit 271 via the printer control unit 285 to start an image forming operation with respect to the image data stored in the RAM 303. The image forming units 120(y, in, c, and k) include photosensitive drums 101(y, m, c, and k), development devices 104(y, m, c, and k), charging rollers 102(y, m, c, and k), photosensitive drum cleaners 107(y, m, c, and k), and the like, respectively. On each of the image forming units 120(y, m, c, and k), a latent image is formed on the photosensitive drum 101 by laser light emitted from a laser scanner unit 103 after a surface of the photosensitive drum 101 is charged. Then, the formed latent image is developed on the photosensitive drum 101 using toner in the development device 104. The toner image developed on the photosensitive drum 101 is then transferred onto an intermediate transfer belt 130 by each of a monochrome primary transfer roller 105(k) and color primary transfer rollers 105(y, m, and c) with a primary transfer voltage applied thereto. The toner image transferred on the intermediate transfer belt 130 reaches a secondary transfer unit 118 based on a rotation of the intermediate transfer belt 130.

The CPU 301 drives the sheet feeding pickup roller 113 and the sheet feeding roller 114 by controlling the motors included in the sheet conveyance unit 270. In response thereto, the sheet feeding pickup roller 113 is rotationally driven, and a sheet is fed and conveyed one by one from the manual sheet feeding tray 111 or a sheet feeding cassette. The conveyed sheet is delivered to a registration roller 116, and the CPU 301 controls a timing at which the registration roller 116 starts rotating such that this timing matches a timing at which the toner image reaches the secondary transfer unit 118.

After that, the CPU 301 causes the toner image to be transferred onto the sheet by applying a secondary transfer voltage to the secondary transfer unit 118 via the printer control unit 285. The sheet with the toner transferred thereon is conveyed to the fixing device 170, and the toner image is fixed on the sheet by being heated. After that, the sheet is discharged onto a sheet discharge tray 132 by a sheet discharge roller 139.

After the print operation is completed, the CPU 301 causes the sheet feeding pickup roller 113 to be moved from the sheet feeding abutment position to a sheet feeding separation position via the printer control unit 285. The sheet feeding separation position is a position at which the sheet feeding pickup roller 113 is separated from the sheet and enables the sheet to be replenished onto the manual sheet feeding tray 111.

The image forming apparatus is provided with a human body detection sensor (also referred to as a human detection sensor) 331, which detects whether there is a human body in the vicinity of the image forming apparatus. The human body detection sensor 331 is an infrared sensor array in which infrared sensors that receive infrared rays are arrayed in a matrix form. The human body detection sensor 331 detects whether there is a human body by receiving an infrared ray emitted from the human body or the like. In the present exemplary embodiment, the human body detection sensor 331 will be described based on the example in which the human body detection sensor 331 detects a human body, but another object can also be detected by the human body detection sensor 331 as long as the object emits an infrared ray. The human body detection sensor 331 is not limited to the infrared sensor, and can be another device (an optical sensor, a strain sensor deformable due to a physical force, a magnetic sensor, a temperature sensor, or the like) as long as this sensor can detect an object approaching the image forming apparatus.

The above-described basic image forming operation and the human body detection are one example, and the present exemplary embodiment shall not be limited to the above-described configuration.

[Description of Operation Unit UI 330]

Figure 3A:
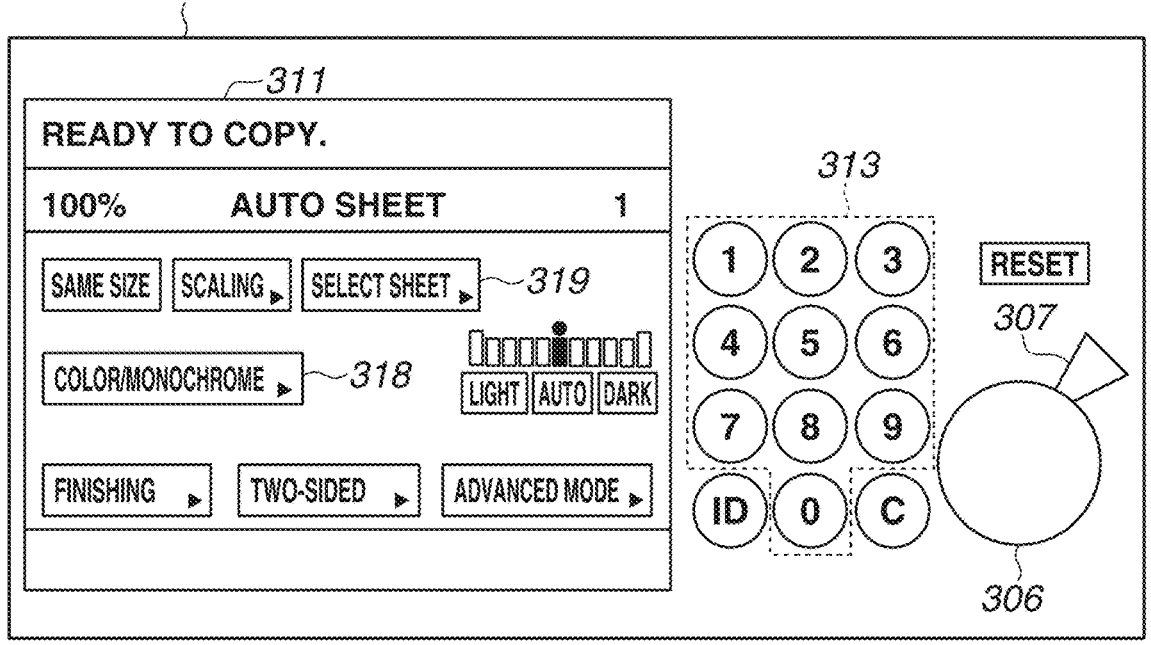
FIGS. 3A, 3B, and 3C illustrate an operation unit.

FIG. 3A illustrates the UI 330. The UI 330 includes a start key 306 for starting a copy operation, a stop key 307 for interrupting the copy operation, a keypad 313 for, for example, setting a number of sheets, and the like. The UI 330 includes a display unit 311 on which a touch panel is formed on a surface thereof, and is configured such that software keys are displayed on a screen.

Figure 3B:
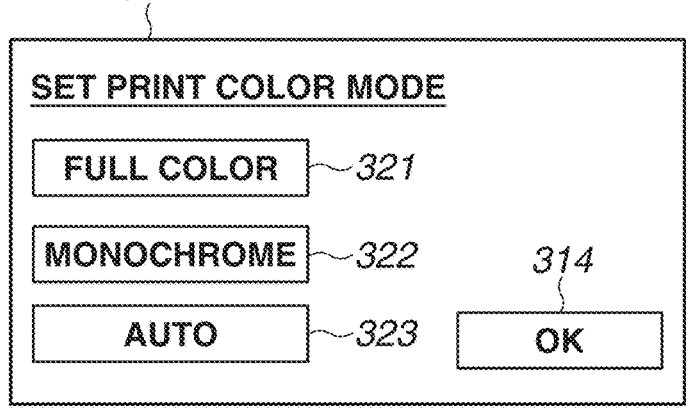

When a "color/monochrome" key 318 is pressed, a screen for setting a print color mode illustrated in FIG. 3B is displayed on the display unit 311. A full color mode key 321, a monochrome mode key 322, a full color/monochrome automatic determination mode key 323 are displayed on the screen illustrated in FIG. 3B. The color mode is set by the user's selecting any key from among the full color mode key 321, the monochrome mode key 322, and the full color/monochrome automatic determination mode key 323 and pressing an OK key 314.

Figure 3C:
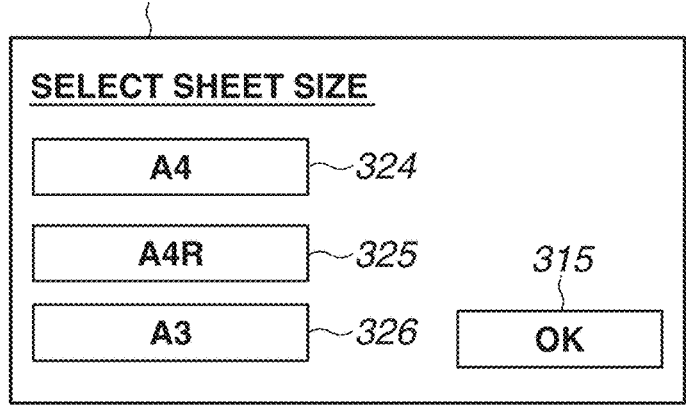

When a "select sheet" key 319 is pressed, a screen for setting the sheet size illustrated in FIG. 3C is displayed on the display unit 311. An A4 key 324, an A4R key 325, and an A3 key 326 are displayed on the screen illustrated in FIG. 3C. The sheet size is set by the user's selecting any key among the A4 key 324, the A4R key 325, and the A3 key 326 and pressing an OK key 315.

When a key regarding a setting of the printing, such as the "color/monochrome" key 318 and the "select sheet" key 319, is operated as an operation performed by the user from which a start of printing is predicted (hereinafter referred to as a printing start prediction operation), the CPU 301 performs print preparation operation control. The start key 306 is a key to instruct the image forming apparatus to start the printing, and therefore is not included in the printing start prediction operation. In addition to the operation on the key regarding the setting of printing, setting a document onto the document tray 152, setting a sheet onto the manual sheet feeding tray 111, and the like also trigger the start of the print preparation operation as the printing start prediction operation.

In the present exemplary embodiment, when a predetermined time has passed without the instruction to start printing input since the start of the print preparation operation triggered by the printing start prediction operation, whether to end or continue the print preparation operation is determined based on a result of the detection by the human body detection sensor 331. This control enables the image forming apparatus to realize appropriate continuous execution of the print preparation operation while reducing an influence on lifetimes of components of the apparatus accompanying the print preparation operation, thereby enabling improvement of usability. Details thereof will be described below.

[Description of Mechanical Configuration of Fixing Device 170]

Figure 4:
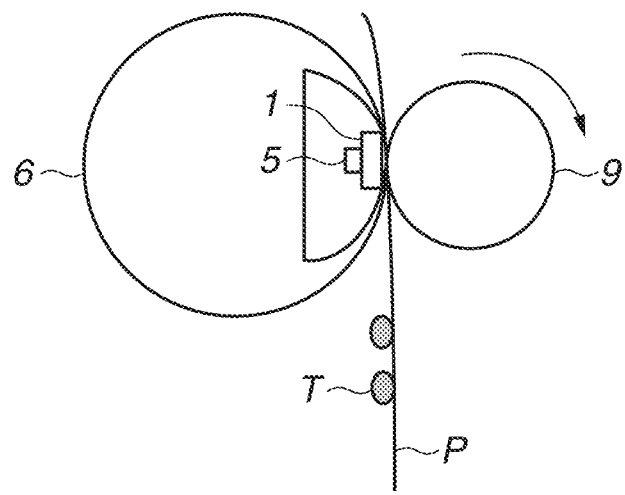
FIG. 4 is a cross-sectional view of a fixing device.

FIG. 4 is a cross-sectional view of the fixing device 170, which fixes an unfixed toner image transferred on a sheet on the sheet.

The fixing device 170 includes a fixing film 6, which is a fixing body made of a cylindrical metallic member, a pressing roller 9, a heater 1, and a thermistor 5. The pressing roller 9 is rotationally driven by fixing driving motor (not illustrated) included in the fixing unit 275. The pressing roller 9 is provided at a position facing the heater 1 by sandwiching the fixing film 6 therebetween, and is in pressure contact with a bottom surface of the heater 1 with, for example, a pressing force of 5 to 20 kgf by a biasing spring (not illustrated). The fixing film 6 is configured to be driven based on a rotation of the pressing roller 9 so as to follow it. The fixing film 6 sandwiched between the heater 1 and the pressing roller 9 forms a fixing nip portion between the fixing film 6 and the pressing roller 9. The heater 1 generates heat by receiving application of power. The thermistor 5 is disposed at a longitudinal central portion of the heater 1. At the time of image formation, the CPU 301 controls a temperature of the heater 1 by changing the power to be supplied to the heater 1 so that a temperature detected by the thermistor 5 matches a predetermined target temperature via the printer control unit 285. When a sheet P bearing a toner image T, which is unfixed thereon, is introduced into the fixing nip portion, the sheet P is conveyed while receiving a pressure at the same time as being heated at the fixing nip portion, and the toner image T is fixed on the sheet P.

[Description of Configuration of Laser Scanner Unit and Description of Driving of Polygon]

Figure 5:
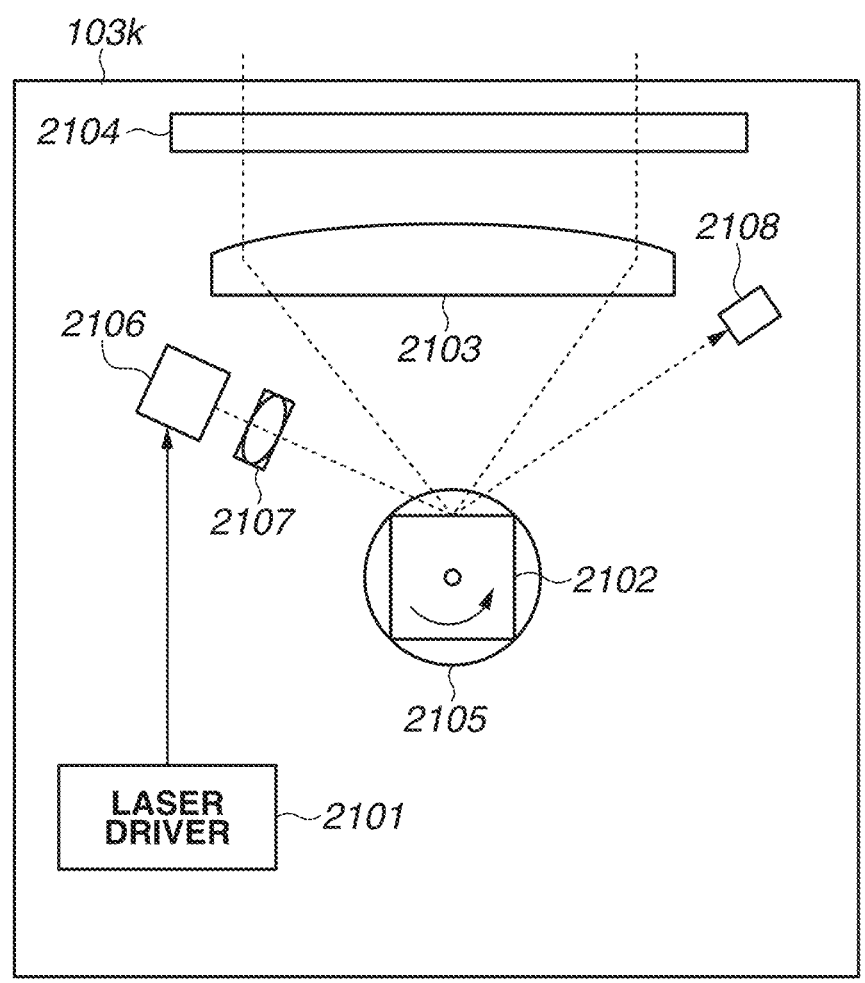
FIG. 5 illustrates a laser scanner unit.

FIG. 5 illustrates the laser scanner unit 103k, which irradiates the photosensitive drum 101k with laser light for exposing the photosensitive drum 101k.

Laser light is output from a laser light source 2106 by a laser driver 2101, and is guided to a polygon mirror (a rotational polygon mirror) 2102 via a collimator lens 2107. The polygon mirror 2102 is rotated in a counterclockwise direction in FIG. 5 by a polygon motor 2105. The laser light reflected by the rotated polygon mirror 2102 exposes the photosensitive drum 101k via an imaging lens 2103 and a reflection mirror 2104. An optical detector 2108 detects the laser light deflected by the polygon mirror 2102.

At the time of the image formation, the CPU 301 controls driving of the polygon motor 2105 such that the polygon mirror 2102 is rotated at a predetermined target speed. When the rotational speed of the polygon mirror 2102 reaches the predetermined speed, the CPU 301 outputs an image signal to the laser driver 2101 via the image signal control unit 281 illustrated in FIG. 2. The laser driver 2101 outputs the laser light modulated based on the image signal. The latent image based on the image signal is formed on the photosensitive drum 101k by exposing and scanning the photosensitive drum 101k to and with the modulated laser light.

When the image formation is carried out, a startup of the laser scanner unit 103k should be completed. The completion of the startup means that the polygon motor 2105 is in a state rotated at a predetermined target speed. Therefore, the print preparation operation at the laser scanner unit 103k refers to making the rotational speed of the polygon mirror 2102 to the target speed. The laser scanner units 103(y, m, and c) are configured similarly to the laser scanner unit 103k, and therefore descriptions thereof will be omitted herein.

[Description of Fixing Temperature Adjustment Control in Print Preparation Operation]

The print preparation operation at the fixing device 170 will be described with reference to FIGS. 6A, 6B, and 6C.

Figure 6A:
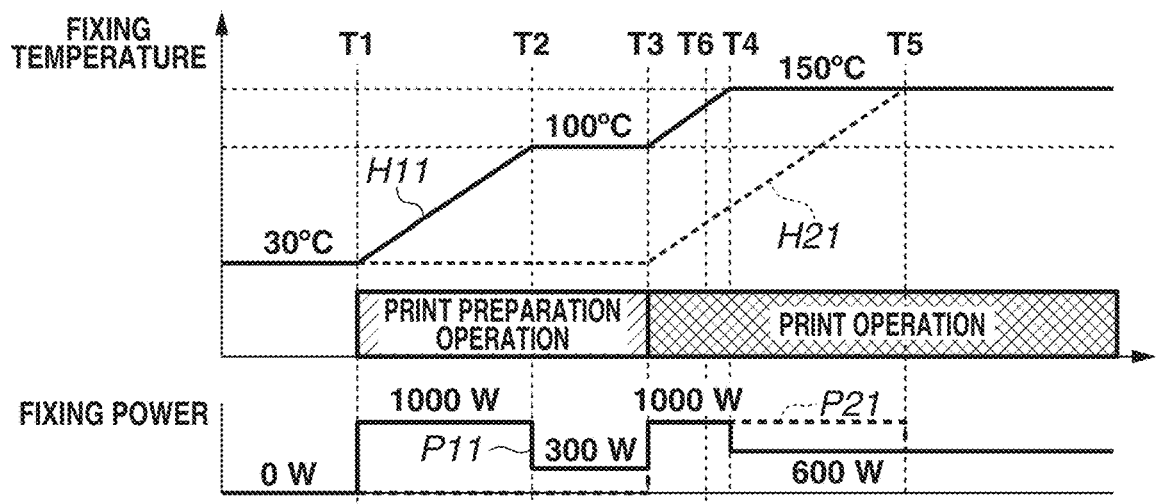
FIGS. 6A, 6B, and 6C illustrate temperature adjustment control on the fixing device.
Figure 6B:
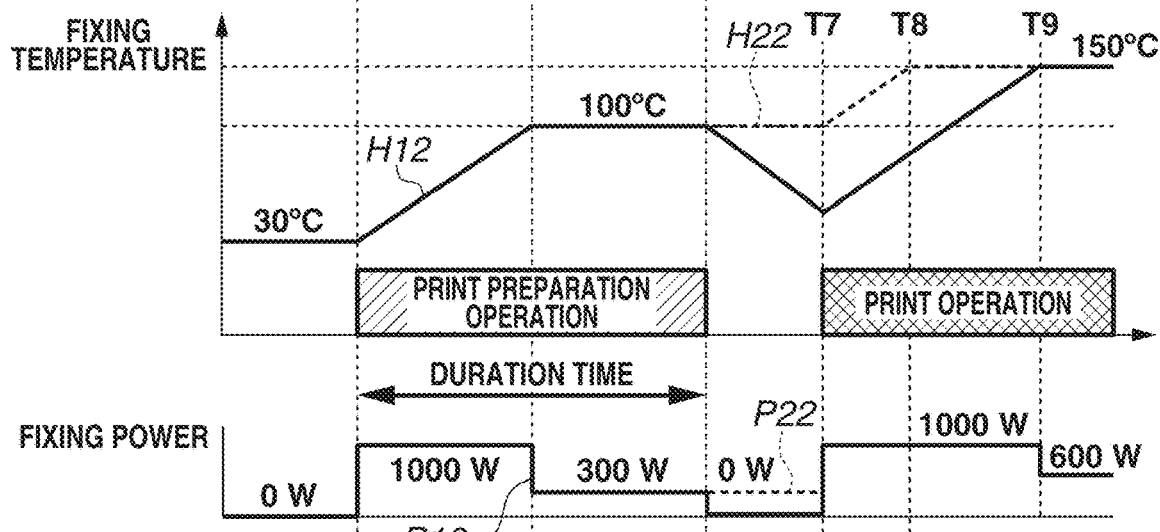
Figure 6C:
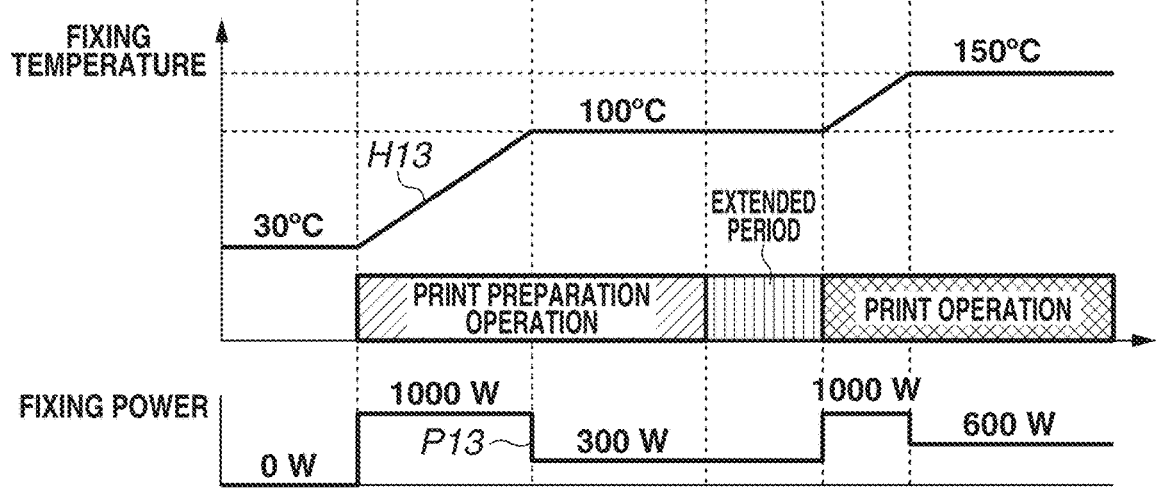

FIGS. 6A to 6C each illustrate a relationship between the temperature detected by the thermistor 5 and the power applied to the heater 1 during the print preparation operation and the print operation. Dotted lines H21 and H22 in FIGS. 6A and 6B each indicate a change in the temperature of the heater 1 in a case where the print preparation operation is not performed even with the printing start prediction operation detected and the fixing device 170 starts up after an instruction to start the printing is issued. Broken lines P21 and P22 each indicate the power supplied to the heater 1. In this case, at time T3 the print start instruction is input. The CPU 301 supplies power of 1000 W to the heater 1 until the temperature of the heater 1 reaches a print temperature (150 degrees Celsius) via the printer control unit 285. Then, at time T5 when the temperature of the heater 1 reaches the target temperature, the CPU 301 switches the supplied power to 600 W to maintain the target temperature. In this manner, because the operation of raising the temperature is performed after the print instruction is received, the temperature of the heater 1 reaches the fixable target temperature at a delayed time and thus a First Copy Output Time (FCOT)/First Print Output Time (FPOT) is undesirably lengthened.

Solid lines H11, H12, and H13 in FIGS. 6A to 6C each indicate a change in the temperature of the heater 1 in a case where the print preparation operation is performed based on the printing start prediction operation. Solid lines P11, P12, and P13 each indicate the power supplied to the heater 1. In this case, when the printing start prediction operation is detected at time T1, the CPU 301 supplies the power of 1000 W to the heater 1 until the temperature detected by the thermistor 5 reaches a print preparation temperature (100 degrees Celsius). Then, when the temperature detected by the thermistor 5 reaches the print preparation temperature at time T2 as indicated by the solid lines H11, H12, and H13, the CPU 301 switches the power supplied to the heater 1 to 300 W to maintain the temperature of the thermistor 5 at the print preparation temperature. The state in which the temperature of the heater 1 reaches the print preparation temperature corresponds to a state in which the fixing device 170 is waiting as being printable, and lasts for a (T6–T2) time unless the printing start instruction or the printing setting operation is issued or performed. In a case where the printing start instruction or the printing setting operation is not issued or performed even at time T6, the power supplied to the heater 1 is switched to 0 W as indicated by the solid line P12.

When the printing start instruction is input at time T3, the CPU 301 supplies the power of 1000 W to the heater 1 until the temperature of the heater 1 reaches the print temperature, which is the fixable temperature, as indicated by the solid line P11. Then, when the temperature of the heater 1 reaches the print temperature at time T4 as indicated by the solid line H11, the CPU 301 switches the supplied power to the power of 600 W supplied to the heater 1 to maintain the print temperature as indicated by the solid line P11. In this manner, because the fixing device 170 is waiting at the print preparation temperature when the printing start instruction is received, the timing of starting the printing can be advanced by a (T5–T4) time and thus the FCOT/FPOT is shortened, compared to the case where the print preparation operation does not start based on the printing start prediction operation.

In a case where the printing start instruction or the printing setting operation is not issued or performed for a predetermined time (a T6–T1 time) since the start of the print preparation operation, the print preparation operation ends and the temperature of the heater 1 is dropping as indicated by the solid line H12. When the printing start instruction is input at time T7, the CPU 301 switches the power supplied to the heater 1 to 1000 W as indicated by the solid line P12. As a result, the temperature of the heater 1 reaches the print temperature at time T9 as indicated by the solid line H12.

In this manner, the FCOT/FPOT is lengthened when the printing start instruction is input after the print preparation operation ends compared to the case where the printing start instruction is input during the print preparation operation.

Hypothetically supposing that the power of 300 W is kept supplied to the heater 1 until time T7 as indicated by the broken line P22, the temperature of the heater 1 would reach the print temperature at time T8 as indicated by the dotted line H22, and the FCOT/FPOT would be shortened. However, the time from the printing start prediction operation to the input of the printing start instruction varies depending on the user, and it is difficult to determine a duration time of the print preparation operation as a fixed value. In other words, it is difficult to determine such an optimum duration time of the print preparation operation that the FCOT/FPOT can be shortened for a majority of users while taking the influence on the lifetime of the fixing device 170 into consideration.

Therefore, in the present exemplary embodiment, the duration time of the print preparation operation is dynamically changed using an output of the human body detection sensor 331. More specifically, in a case where the human body detection sensor 331 detects a human body at time T6 after the print preparation operation starts, the CPU 301 continues the power supply (300 W) to the heater 1 for a predetermined time (T7–T6) as indicated by the solid line P13. In other words, the CPU 301 extends the print preparation operation. In a case where the human body detection sensor 331 shifts from the state detecting a human body to the state detecting no human body while the print preparation operation is in progress, the CPU 301 ends the print preparation operation. As a result, the image forming apparatus can shorten the FCOT/FPOT for the majority of users while taking the influence on the lifetime of the fixing device 170 into consideration.

[Description of Control Regarding Print Preparation Operation]

Figure 7:
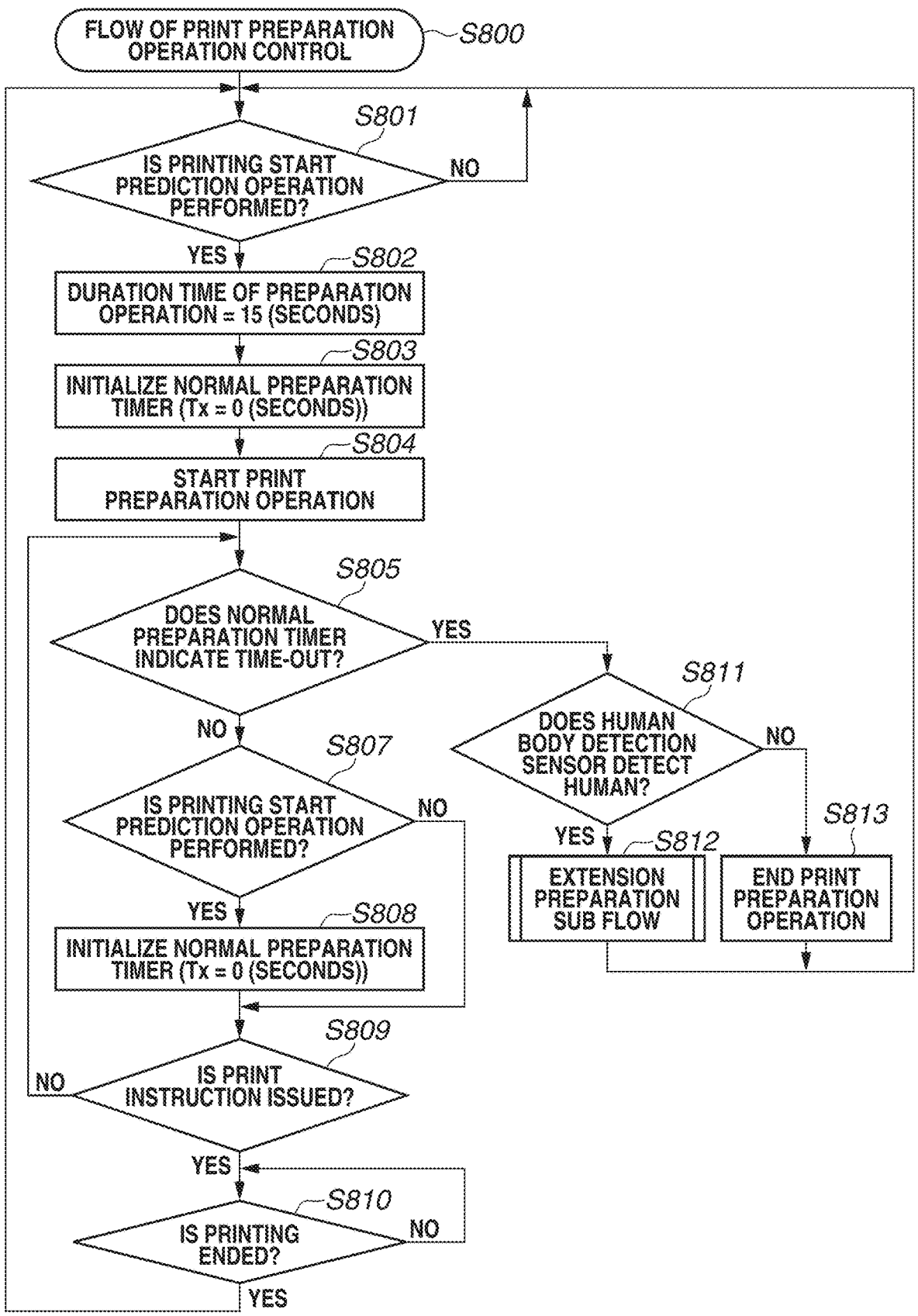
FIG. 7 is a flowchart illustrating control regarding a print preparation operation.

FIG. 7 is a flowchart illustrating control regarding the print preparation operation that starts based on the printing start prediction operation. The present flow is performed by the CPU 301 in a case where the image forming operation is not performed.

In step S801, the CPU 301 determines whether the printing start prediction operation is performed. In a case where the printing start prediction operation is not performed (NO in step S801), the CPU 301 repeatedly determines whether this operation is performed.

In a case where the printing start prediction operation is performed (YES in step S801), in step S802, the CPU 301 sets 15 seconds as a duration time of the print preparation operation into the RAM 303. This duration time is one example, and the duration time of the print preparation operation is not limited to 15 seconds.

In step S803, the CPU 301 initializes a normal preparation timer Tx, and starts counting time (Tx=0). The normal preparation timer refers to a timer for measuring the set duration time of the print preparation operation.

In step S804, the CPU 301 causes the fixing unit 275 to start the print preparation operation thereof via the printer control unit 285. More specifically, the CPU 301 causes the temperature of the heater 1 to reach the print preparation temperature (100 degrees) as described above.

In step S805, the CPU 301 determines whether the normal preparation timer Tx measures the set duration time (whether a time-out has occurred). In a case where the normal preparation timer Tx does not indicate the time-out (NO in step S805), the processing proceeds to step S807. In a case where the normal preparation timer Tx indicates the time-out (YES in step S805), the processing proceeds to step S811.

In step S807, the CPU 301 determines whether the printing start prediction operation is performed again while the print preparation operation is in progress. In a case where the printing start prediction operation is performed (YES in step S807), in step S808, the CPU 301 initializes the normal preparation timer Tx (Tx=0) because the user will highly likely input a printing start instruction after that. As a result, the print preparation operation continues for the set duration time (15 seconds) when the printing start prediction operation is received again.

In step S809, the CPU 301 determines whether the printing start instruction is input. In a case where the printing start instruction is not input (NO in step S809), the processing returns to step S805. In a case where the printing start instruction is input (YES in step S809), the processing proceeds to step S810.

In step S810, the CPU 301 determines whether the print operation ends. If the print operation ends (YES in step S810), the processing returns to step S801, in which the CPU 301 determines whether the printing start prediction operation is performed again.

Processing in a case where the normal preparation timer Tx indicates the time-out in the determination in step S805 will be described.

In step S811, when the normal preparation timer Tx indicates the time-out, the CPU 301 determines whether there is a human body near the image forming apparatus using the human body detection sensor 331. In a case where the human body detection sensor 331 does not a human body (NO in step S811), in step S813, the CPU 301 ends the print preparation operation because the print preparation operation does not have to continue. In a case where the human body detection sensor 331 detects a human body (YES in step S811), the presence of the human body with the printing start prediction operation performed by the user indicates that a print job will be highly likely input after that. Therefore, in step S812, the CPU 301 performs an extension preparation sub flow for extending the print preparation operation. Details thereof will be described below. [Description of Print Preparation Operation Sub Flow]

Figure 8:
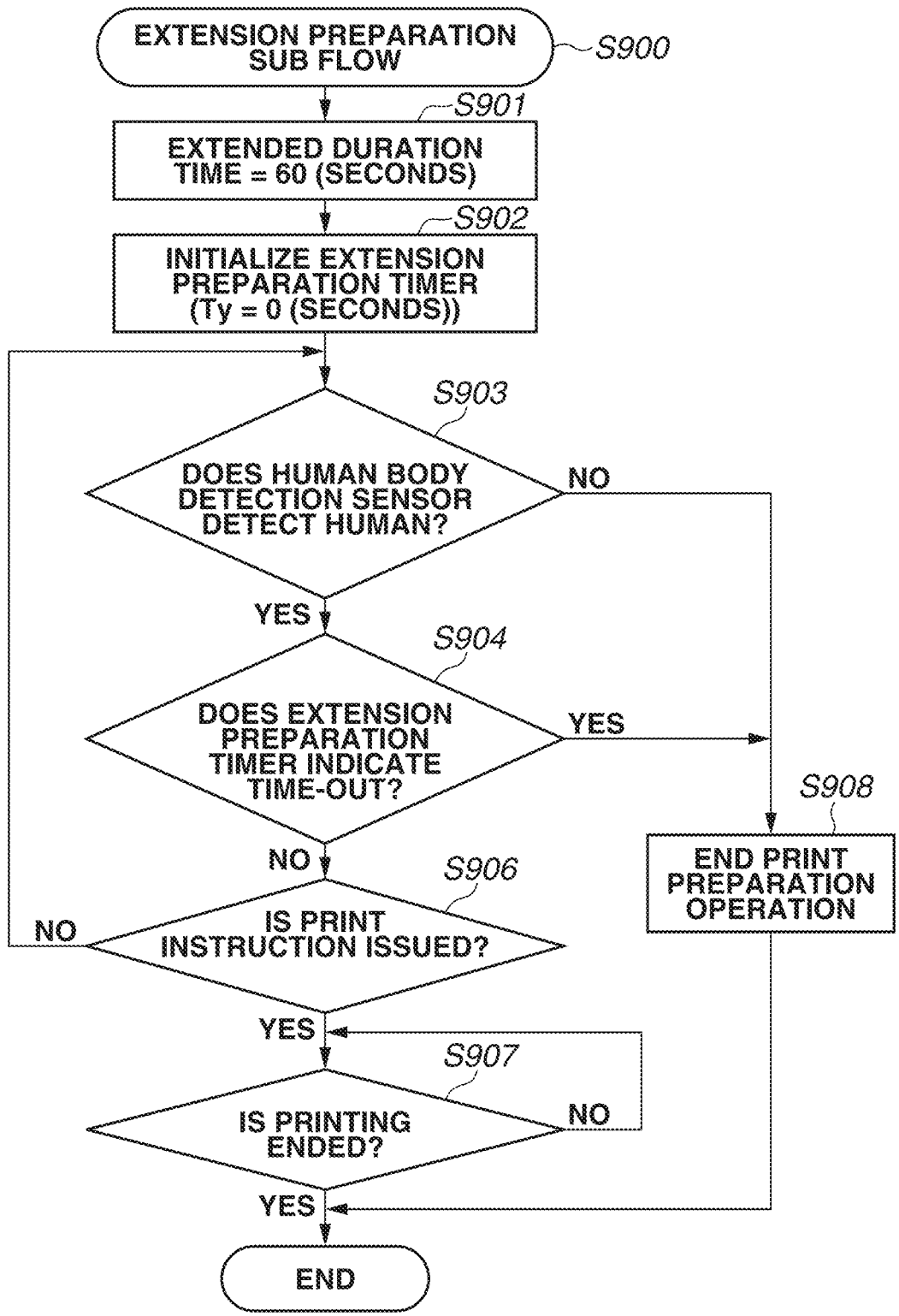
FIG. 8 is a flowchart illustrating an extended print preparation operation.

The extension preparation sub flow will be described with reference to FIG. 8. FIG. 8 illustrates control of extending the print preparation operation based on the detection of the human body by the human body detection sensor 331 when the normal preparation timer Tx indicates the time-out after starting counting time based on the printing start prediction operation.

In step S901, the CPU 301 sets 60 seconds as a time by which the print preparation operation is extended (an extended duration time) into the RAM 303. In the print preparation sub flow, the extended print preparation operation continues in a case where there is a human body near the image forming apparatus, and the extended print preparation operation ends in a case where the human body leaves the image forming apparatus. However, if the human body remains near the image forming apparatus for a long time, the print preparation operation unintentionally lasts for a long time, thereby undesirably affecting the lifetime. Therefore, a time-out is set to the extended print preparation operation itself to reduce the influence on the lifetime. The extended duration time is set to 60 seconds in the present exemplary embodiment, but shall not be limited thereto.

In step S902, the CPU 301 initializes an extension preparation timer Ty (Ty=0). In step S903, the CPU 301 determines whether the human body detection sensor 331 detects a human body. In a case where the human body detection sensor 331 detects a human body (YES in step S903), the processing proceeds to step S904. In a case where the human body detection sensor 331 does not detect a human body (NO in step S903), in step S908, the CPU 301 ends the extended print preparation operation.

In step S904, the CPU 301 determines whether the extension preparation timer Ty indicates the time-out. In a case where the extension preparation timer Ty indicates the time-out (YES in step S904), in step S908, the CPU 301 ends the print preparation operation.

In a case where the extension preparation timer Ty does not indicate the time-out (NO in step S904), in step S906, the CPU 301 determines whether a print start instruction is issued. In a case where the print start instruction is not issued (NO in step S906), the processing returns to step S903. In a case where the print start instruction is issued (YES in step S906), in step S907, the CPU 301 determines whether the print operation ends. In a case where the print operation ends (YES in step S907), the CPU 301 ends the extension preparation sub flow.

By the above-described processing, the continuation/end of the print preparation operation is controlled based on the result of the detection by the human body detection sensor 331 during the extended print preparation operation using the human body detection sensor 331.

[Description of Fixing Temperature Adjustment Control in Extended Print Preparation Operation]

The fixing temperature adjustment control in the extended print preparation operation will be described with reference to FIGS. 6B, 6C, 9A, and 9B.

The fixing temperature adjustment control will be described based on a comparison between the fixing temperature adjustment control in FIG. 6B illustrating it without the print preparation operation extended, and the fixing temperature adjustment control in FIG. 6C illustrating it with the print preparation operation extended. In FIG. 6C, the print preparation operation reaches the end of the duration time of the print preparation at time T6, but is extended due to the detection of a human body and continues even after time T6. In FIG. 6B, no human body is detected at time T6, and therefore the print preparation operation ends. In sum, this comparison reveals that, in FIG. 6C, the print preparation temperature is maintained even after time T6 and therefore the FCOT/FPOT is shortened by a (T9−T8) time compared to FIG. 6B.

FIG. 9A illustrates the fixing temperature adjustment control in a case where the human body detection sensor 331 comes to detect no human body (since no more human bodies exists) during the extended print preparation operation. FIG. 9B illustrates the fixing temperature adjustment control in a case where the human body detection sensor 331 detects a human body even after the extended duration time has passed since the extension of the print preparation operation.

In FIG. 9A, the print preparation operation starts due to the detection of the printing start prediction operation at time T10, and the duration time of the print preparation operation ends at time T12. However, the human body detection sensor 331 still detects a human body at time T12, and therefore the print preparation operation continues. After that, the human body detection sensor 331 comes to detect no human body (since no more human bodies exists) at time T13 before the extended duration time has passed, and therefore the extended print preparation operation ends.

FIG. 9B is similar to FIG. 9A until time T12. The human body detection sensor 331 still detects the human body at time T2, and therefore the print preparation operation is extended. After that, when the extended duration time (60 seconds) has passed at time T14 with the human body detection sensor 331 continuing to detect the human body, the print preparation operation ends even with the human body detection sensor 331 continuously detecting the human body.

The relationship between the human body detection sensor 331 and the extension/end of the print preparation operation (the premature operation) at the fixing device 170 has been described in the descriptions of FIGS. 6B, 6C, 9A, and 9B. Regarding the print preparation operation of rotating the polygon mirror 2102 of the laser scanner unit 103, a similar relationship is also established between the human body detection sensor 331 and extension/end of the rotation of the polygon mirror 2102. A similar relationship is also established regarding the other print preparation operations.

In the above-described exemplary embodiment, the result of the detection by the human body detection sensor 331 is not taken into consideration before the set duration time has passed in a case where the print preparation operation starts based on the detection of the printing start prediction operation. However, the CPU 301 can be configured to end the print preparation operation in a case where the human body detection sensor 331 comes to detect no human body (since no more human bodies exists) before the set duration time has passed.

In this manner, according to the present exemplary embodiment, the print preparation operation continues or ends based on whether there is a human body even after the duration time has passed since the start of the print preparation operation. This control enables the image forming apparatus to realize the appropriate continuous execution of the print preparation operation while reducing the influence on the lifetime accompanying the print preparation operation, thereby enabling improvement of the usability.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-129179, filed Jul. 6, 2018, which is hereby incorporated by reference herein in its entirety.

What is claimed is:

1. An image forming apparatus comprising:
an image forming unit configured to form an image on a sheet;
an input unit configured to receive an input of a start instruction for forming the image;
a first detector configured to detect an operation from which the input of the start instruction is predicted;
a second detector configured to detect a human body; and
a controller configured to control the image forming unit to start a preparation operation for bringing the image forming unit into a state ready to form the image even without input of the start instruction in a case where the operation is detected by the first detector,
wherein the controller controls the image forming unit to end the preparation operation in a case where the start instruction is not input even after a first predetermined time has passed since the start of the preparation operation and the second detector does not detect the human body, and controls the image forming unit to continue the preparation operation in a case where the start instruction is not input even after the first predetermined time has passed since the start of the preparation operation and the second detector detects the human body.

2. The image forming apparatus according to claim 1, wherein the controller controls the image forming unit to end the preparation operation when the second detector comes to detect no human body in a case where the preparation operation continues based on the detection of the human body by the second detector.

3. The image forming apparatus according to claim 1, wherein the controller controls the image forming unit to end the preparation operation in a case where the second detector comes to detect no human body before the first predetermined time has passed since the detection of the operation by the first detector.

4. The image forming apparatus according to claim 1, wherein the controller controls the image forming unit to continue the preparation operation for the first predetermined time regardless of a result of the detection by the second detector until the first predetermined time has passed since the detection of the operation by the first detector.

5. The image forming apparatus according to claim 1,
wherein the image forming unit includes a light source configured to emit light and a rotational polygon mirror configured to deflect the emitted light, and
wherein the preparation operation includes an operation of causing the rotational polygon mirror to rotate at a predetermined rotational speed.

6. The image forming apparatus according to claim 1,
wherein the image forming unit includes a fixing unit configured to fix a toner image on the sheet, and
wherein the preparation operation includes an operation of maintaining a temperature of the fixing unit at a predetermined temperature lower than a temperature when the fixing unit fixes the toner image.

7. The image forming apparatus according to claim 1, further comprising an operation panel configured to perform a setting operation for image formation,
wherein the operation detected by the first detector is the setting operation using the operation panel.

8. The image forming apparatus according to claim 1, further comprising:
a sheet tray configured such that the sheet is placed thereon; and
a third detector configured to detect whether the sheet is on the sheet tray,
wherein the operation detected by the first detector is placing the sheet on the sheet tray.

9. The image forming apparatus according to claim 1, further comprising:
a document tray configured such that a document is placed thereon; and
a fourth detector configured to detect whether the document is on the document tray,
wherein the operation detected by the first detector is placing the document on the document tray.

10. An image forming apparatus comprising:
an image forming unit configured to form an image on a sheet;
an input unit configured to receive an input of a start instruction for forming the image;
a first detector configured to detect an operation from which the input of the start instruction is predicted;
a second detector configured to detect a human body; and
a controller configured to control the image forming unit to start a preparation operation for bringing the image forming unit into a state ready to form the image even without input of the start instruction in a case where the operation is detected by the first detector,
wherein the controller controls the image forming unit to end the preparation operation in a case where the start instruction is not input even after a first predetermined time has passed since the start of the preparation operation and the second detector does not detect the human body, and controls the image forming unit to continue the preparation operation in a case where the start instruction is not input even after the first predetermined time has passed since the start of the preparation operation and the second detector detects the human body, and
wherein the controller controls the image forming unit to end the preparation operation in a case where the start instruction is not input even after a second predetermined time has passed with the second detector continuing to detect the human body since continuation of the preparation operation based on the detection of the human body by the second detector.

11. The image forming apparatus according to claim 10,
wherein the image forming unit includes a light source configured to emit light and a rotational polygon mirror configured to deflect the emitted light, and
wherein the preparation operation includes an operation of causing the rotational polygon mirror to rotate at a predetermined rotational speed.

12. The image forming apparatus according to claim 10,
wherein the image forming unit includes a fixing unit configured to fix a toner image on the sheet, and
wherein the preparation operation includes an operation of maintaining a temperature of the fixing unit at a predetermined temperature lower than a temperature when the fixing unit fixes the toner image.

13. The image forming apparatus according to claim 10, further comprising an operation panel configured to perform a setting operation for image formation,
wherein the operation detected by the first detector is the setting operation using the operation panel.

14. The image forming apparatus according to claim 10, further comprising:
a sheet tray configured such that the sheet is placed thereon; and
a third detector configured to detect whether the sheet is on the sheet tray,
wherein the operation detected by the first detector is placing the sheet on the sheet tray.

15. The image forming apparatus according to claim 10, further comprising:
a document tray configured such that a document is placed thereon; and
a fourth detector configured to detect whether the document is on the document tray,
wherein the operation detected by the first detector is placing the document on the document tray.

16. A method for controlling an image forming apparatus including an image forming unit configured to form an image on a sheet, an input unit configured to receive an input of a start instruction for forming the image, a first detector configured to detect an operation from which the input of the start instruction is predicted, and a second detector configured to detect a human body, the method comprising:
controlling the image forming unit to start a preparation operation for bringing the image forming unit into a state ready to form the image even without input of the start instruction in a case where the operation is detected by the first detector;
controlling the image forming unit to end the preparation operation in a case where the start instruction is not input even after a first predetermined time has passed since the start of the preparation operation and the second detector does not detect the human body; and
controlling the image forming unit to continue the preparation operation in a case where the start instruction is not input even after the first predetermined time has passed since the start of the preparation operation and the second detector detects the human body.

\* \* \* \* \*